United States Patent [19]
Kubota et al.

[11] Patent Number: 5,280,436
[45] Date of Patent: Jan. 18, 1994

[54] METHOD FOR MEASURING THREE-DIMENSIONAL POSITION OF OBJECT TO BE CAPTURED AND METHOD FOR CAPTURING THE OBJECT

[75] Inventors: Hitoshi Kubota, Moriguchi; Manabu Yamane, Neyagawa; Takashi Anezaki; Hiroyuki Inoue, both of Hirakata; Tomohiro Maruo, Katano, all of Japan

[73] Assignee: Matsushita Electric Industrial Co., Ltd., Kadoma, Japan

[21] Appl. No.: 686,390

[22] Filed: Apr. 17, 1991

[30] Foreign Application Priority Data

Apr. 18, 1990 [JP] Japan .................................. 2-101971

[51] Int. Cl.⁵ ............................................. G06F 15/20
[52] U.S. Cl. ..................................... 364/559; 356/375; 382/8; 901/47
[58] Field of Search ..................... 33/297; 356/375; 364/559; 382/8; 901/47

[56] References Cited

U.S. PATENT DOCUMENTS

| | | | |
|---|---|---|---|
| 4,146,924 | 3/1979 | Birk et al. | 364/559 X |
| 4,630,225 | 12/1986 | Hisano | 382/8 X |
| 4,731,856 | 3/1988 | Lloyd et al. | 382/8 |
| 4,791,482 | 12/1988 | Barry et al. | 382/8 X |
| 4,792,698 | 12/1988 | Pryor | 356/376 X |
| 4,794,262 | 12/1988 | Sato et al. | 356/376 X |
| 4,803,735 | 2/1989 | Nishida et al. | 382/8 |
| 4,867,570 | 9/1989 | Sorimachi et al. | 356/376 |

Primary Examiner—Edward R. Cosimano
Attorney, Agent, or Firm—Wenderoth Lind & Ponack

[57] ABSTRACT

A method for measuring the three-dimensional position of an object to be captured. A laser measuring unit is provided having an image recognition camera confronting the object, first and second laser light emitting sources respectively irradiating from a slant direction a lateral slit light onto the object relative to a vertical axis of a vision coordinate system and irradiating a vertical slit light onto the object relative to a lateral axis of the vision coordinate system, one slit image on the vertical axis of the object and one slit image on the lateral axis of the object and one of the slit images on the vertical and lateral axes formed before and after the laser measuring unit is moved a predetermined amount in a direction of a camera optical axis relative to the object are taken into the camera, and the three-dimensional position is calculated from the relationship between the predetermined moving distance amount and the deviation of the slit images on the vision coordinates of the coordinate system. This method can be used to locate an electric adjustment position of an electronic component and to move the hand of an industrial robot carrying an electric adjustment member to the electronic component for adjusting the electronic component in the electric adjustment position.

4 Claims, 13 Drawing Sheets

METHOD FOR MEASURING THREE-DIMENSIONAL POSITION OF OBJECT TO BE CAPTURED AND METHOD FOR CAPTURING THE OBJECT

BACKGROUND OF THE INVENTION

The present invention relates to a method for measuring a three-dimensional position of an object to be captured which automatically effects, by a robot, the white balance adjustment and cut-off adjustment of primarily industrial displays (hereinafter referred to as display) and a method for capturing the object located at the three-dimensional position.

In the production process of display devices, the positioning thereof is difficult because of the rotary structure of the display device and the unique shape of the cathode-ray tube, and the positioning of a printed circuit board installed behind the cathode-ray tube is also difficult, and is mostly manually effected.

In order to automatically effect the white balance adjustment and cut-off adjustment of the display device, there have been tried a method of fastening the printed circuit board installed behind the cathode-ray tube with a jig so as to electrically adjust it by an automatic apparatus, and an electrical adjustment method arranged to contact a probe with the printed circuit board with a force controllable robot so as to read the current position, and to obtain the three-dimensional position of the printed circuit board by repeating the operation at six points in total.

However, there have been recently provided many kinds of displays, and therefore, according to the method of fastening the printed circuit board installed behind the cathode-ray tube with a jig by electrically adjusting with an automatic apparatus, the position of the jig has to be changed in accordance with the kinds of displays, and in the case of a display having a rotary structure, it is almost impossible to fix the position of the jig.

Furthermore, in the method of using the force controllable robot, since the force control accuracy of the robot is poor and the printed circuit board is deflected by the contact of a probe, it is difficult to obtain a correct value. Furthermore, because of six points measurement, there is a disadvantage of a long measuring time.

In view of the foregoing, an essential object of the present invention is to provide a practical method for measuring without contact the three-dimensional position of an object such as a printed circuit board by using visual recognition.

SUMMARY OF THE INVENTION

In order to accomplish the above object, according to a first aspect of the present invention, there is provided a method for measuring a three-dimensional position of an object to be captured which is adapted so that a laser measuring unit having an image recognition camera confronting the object, a first laser emitting light source for irradiating a lateral slit light onto the object from a slant direction relative to a vertical axis of a vision coordinate system, and a second laser emitting light source for irradiating a vertical slit light from a slant direction relative to a lateral axis of the vision coordinate system are mounted on a hand portion of an industrial robot, one slit image on the vertical line of the object and one slit image on the lateral line thereof and one of the slit images on the vertical and lateral lines thereof formed before and after the laser measuring unit is moved a predetermined amount in a direction of a camera optical axis relative to the object are taken into the camera, and the three-dimensional position of the object is calculated from relationship between a pretaught moving distance of the laser measuring unit and deviation of the slit images on vision coordinates of the coordinate system.

According to the first aspect of the present invention, the lateral slit light and the vertical slit light are irradiated onto the vertical and lateral end lines of the object and the images thereof are taken into the camera, and then shifts of respective slit lights when the camera and the light sources are moved in the camera optical axis direction are read out, and by comparing, on the camera coordinates, the reading with the relationship of movement of the slit light position relative to the movement of the measuring unit comprising the camera and the light sources, the three-dimensional position of the object can be measured.

Furthermore, according to a second aspect of the present invention, there is provided a method for measuring a three-dimensional position of an object to be captured during installing an electric adjustment member at an electric adjustment position for the object, comprising the steps of:

calculating a three-dimensional position of an electronic component as the object by the method in accordance with the first aspect;

teaching previously a current electric adjustment position of the electric adjustment member mounted on the hand portion of the industrial robot;

calculating a three-dimensional position of a new electronic component by the calculation method in accordance with the foregoing first aspect of the invention with the three-dimensional position of the electronic component and the electric adjustment position used as reference positions; and compensating a reference electric adjustment position of the electronic component by an amount of deviation from the reference position of the electronic component so as to obtain an electric adjustment position of the new electronic component.

According to the second aspect of the present invention, the reference point for the relative position where the adjustment member is to be engaged with the electrical adjustment portion of the electronic component is compared with the three-dimensional position of the object measured according to the method of the first aspect of the present invention so as to obtain the variation of the measured position of the electronic component as a deviation from the reference point, and the electronic component and the adjustment member can be adjusted to cause the three dimensional positions to coincide by moving the robot so as to compensate for the deviation.

According to a third aspect of the present invention, there is provided a method for capturing an object located at a three-dimensional position thereof, comprising the steps of:

installing at least two claws with tapered portions for capturing an end face of an electronic component by an electric adjustment member mounted on a hand portion of an industrial robot;

recognizing a closed state and an open state of the capturing claws when the tapered portions thereof are moved along the end face of the electronic component;

moving the electric adjustment member to an electric adjustment position of the electronic component obtained by the method according to the second aspect of the invention when the claws are normally closed;

opening the claws when they are moved along the end face of the electronic component after contact of tapered portions therewith and then closing the claws at a final capturing position because of nonexistence of tapered portions;

stopping movement of the industrial robot when all of the capturing claws have shifted from the closed state, through the opened state to the closed state again; and determining whether a current position of the industrial robot is a capturing position of the electronic component.

There is also provided an object capturing method according to the fourth aspect of the present invention, the object capturing method in accordance with the third aspect further comprising the steps of:

cutting off only a servo power source for a particular axis of the industrial robot, which is actuated with a servo actuator driven by the servo power source, at the capturing position so as to release stress of the electric adjustment member and the hand portion of the industrial robot at the capturing position of the electronic component in a servo-free state; and servo-locking after determining that the current position of the industrial robot at servo-free time is the final capturing position of the electronic component.

Furthermore, according to the method of the fourth aspect of the present invention, in adjusting the adjustment member relative to the electronic component, the correct adjustment position is obtained by compensating measurement errors through closing and opening operation of the object capturing portion provided on the adjustment member, and further, the predetermined operational axis of the robot is temporarily released from the servo control to correct the deviation in the adjustment position and thus to effect the correct adjustment.

BRIEF DESCRIPTION OF THE DRAWINGS

These and other objects and features of the present invention will become apparent from the following description taken in conjunction with reference to the accompanying drawings, in which:

FIG. 1 through FIG. 17 show a preferred embodiment of the present invention, in which FIG. 1 is a schematic diagram showing the depth calculation principle with a lateral slit light;

FIG. 2 is a schematic diagram showing the depth calculation principle with a vertical slit light;

FIG. 3 is an elevation drawing of the three-dimensional position measuring system;

FIG. 4 is a schematic diagram showing the operation axes of a robot;

FIG. 5 is a perspective view of a the laser measuring unit;

FIG. 6 is a view of the lateral slit showing two values;

FIG. 7 is a view of the vertical slit showing two values;

FIG. 8 is a flowchart of the operation of the three-dimensional position measuring system using the lateral slit;

FIG. 9 ia a flowchart of the operation of the three-dimensional position measuring system using the vertical slit;

FIG. 10 is a drawing showing the construction of the workpiece position measuring method;

FIG. 11 is a perspective drawing showing the slit light irradiation onto the workpiece, FIG. 12 is a schematic diagram for explaining the three-dimensional position calculation method for a printed circuit board;

FIG. 13 is a perspective drawing showing the state of capturing of an electrical adjustment member;

FIG. 14 is a perspective view of the electrical adjustment member;

FIG. 15 is an operation flowchart of the shift of the capturing claws of the electrical adjustment member;

FIG. 16 is drawing showing the overall construction of an automatic adjustment method for the display; and FIG. 17 is a control system diagram.

DETAILED DESCRIPTION OF THE INVENTION

A preferred embodiment of the respective aspects of the present invention will be described below in due order with reference to the accompanying drawings.

(1) First, the principle of measuring a three-dimensional position by using a slit light will be explained with reference to FIGS. 1 and 2.

Figure 1:
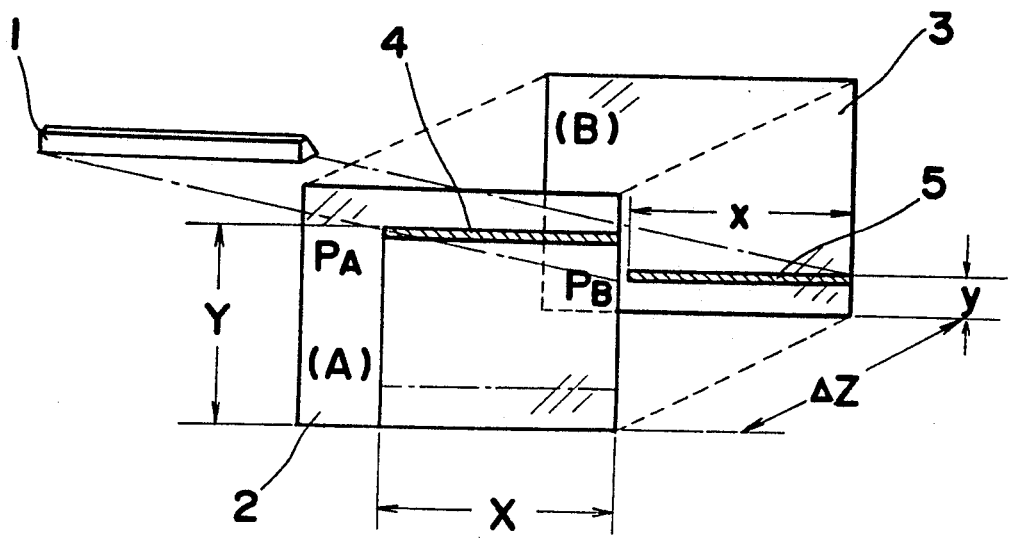
Figure 2:
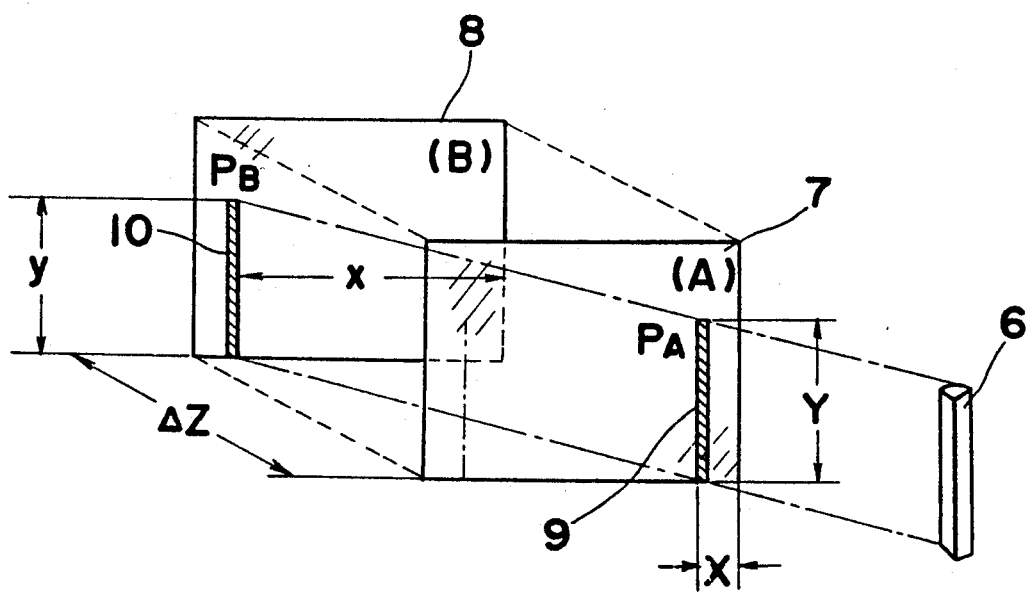

FIG. 1 shows a method for measuring the three-dimensional position by using a lateral slit light, and FIG. 2 shows a method for measuring the three-dimensional position by using a vertical slit light.

In FIG. 1, reference numeral 1 denotes a laser light source for emitting a lateral slit light, reference numeral 2 denotes a light irradiation surface A of a workpiece as one example of an object to be measured, reference numeral 3 denotes a light irradiation surface B of the workpiece after it has been moved by distance $\Delta Z$ in the depth direction of the lateral slit, $P_A$ denotes coordinates of the end point of the lateral slit light 4 with respect to, the work irradiation surface A, and $P_B$ denotes coordinates of the end point of the lateral slit light 5 with respect to the work irradiation surface B.

When $P_A=(X, Y, Z)$, and $P_B=(x, y, z)$, $Z=z+K_Y*(Y-y)$, where $K_Y$ is a constant.

In FIG. 2, reference numeral 6 denotes a laser light source for emitting a vertical slit light, reference numeral 7 denotes the light irradiation surface A of the workpiece, reference numeral 8 denotes the light irradiation surface B of the workpiece after it has been moved by distance $\Delta Z$ in the depth direction of the vertical slit, $P_A$ denotes coordinates of an end point of the vertical slit light 9 with respect to the irradiation surface A, and $P_B$ denotes coordinates of the end point of the vertical slit light 10 with respect to the work irradiation surface B.

When $P_A=(X, Y, Z)$, and $P_B=(x, y, z)$, $Z=z+K_X*(Y-y)$, where "$K_X$" is a constant.

Next, by applying the above principle and using a robot, a method for calculating the three-dimensional position by using a lateral slit light and a vertical slit light will be described.

Figure 3:
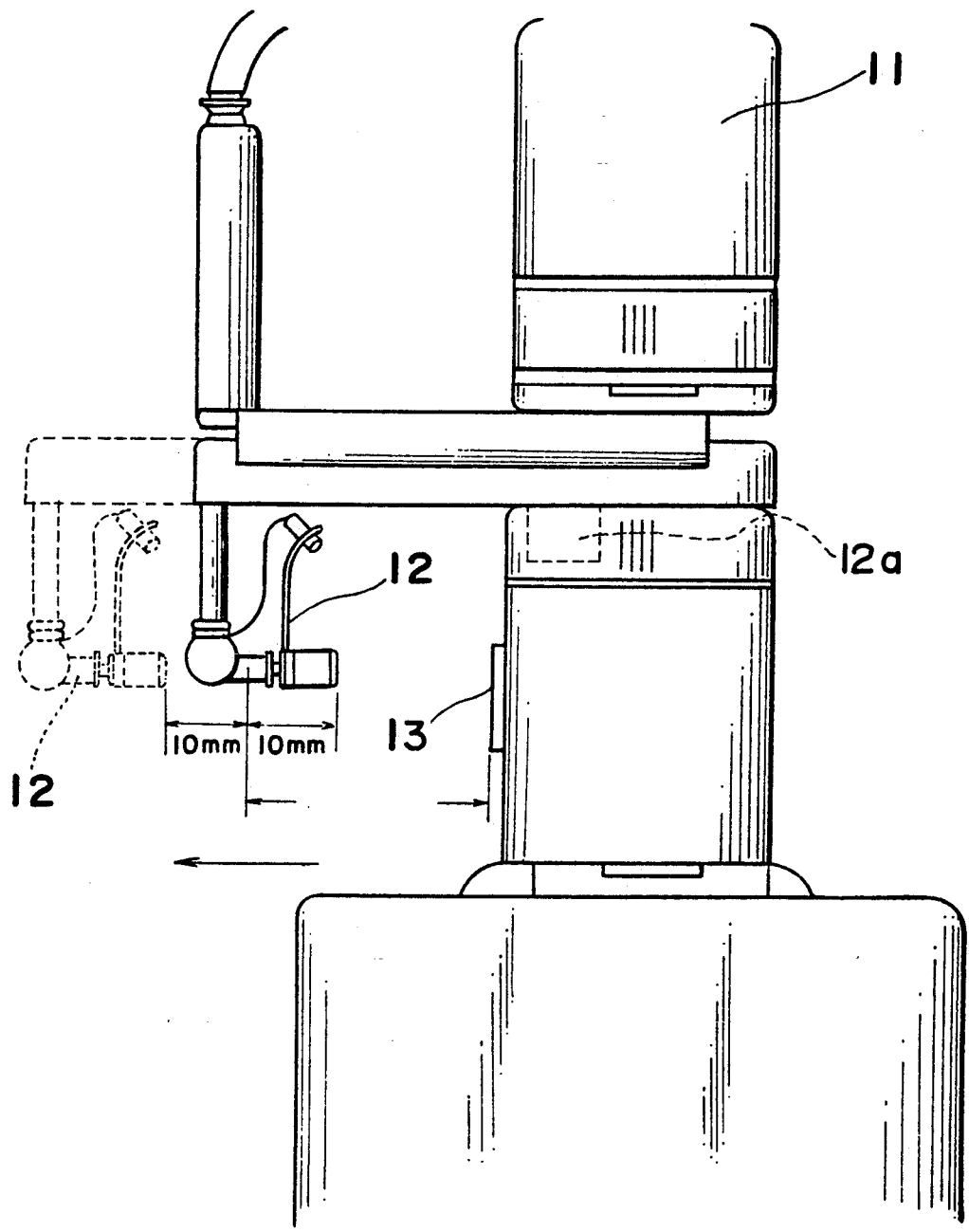

FIG. 3 shows a construction of the three-dimensional position measuring system, which includes a robot 11 used for this system, a laser measuring unit 12, a sample 13 irradiated by a laser light, and a servo motor 12a for driving the laser measuring unit 12.

Figure 4:
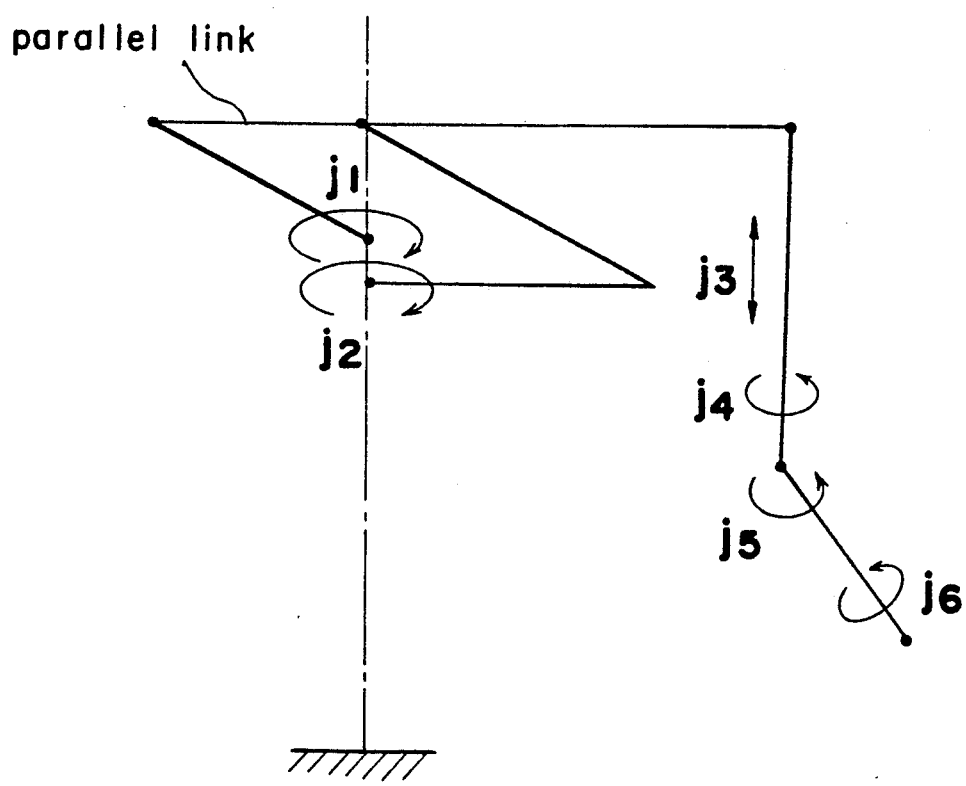

The robot 11 has six operation axes in total, so that the robot 11 is able to take an arbitrary position, and an arbitrary posture. FIG. 4 shows the detailed arrangement of the axes thereof.

Figure 5:
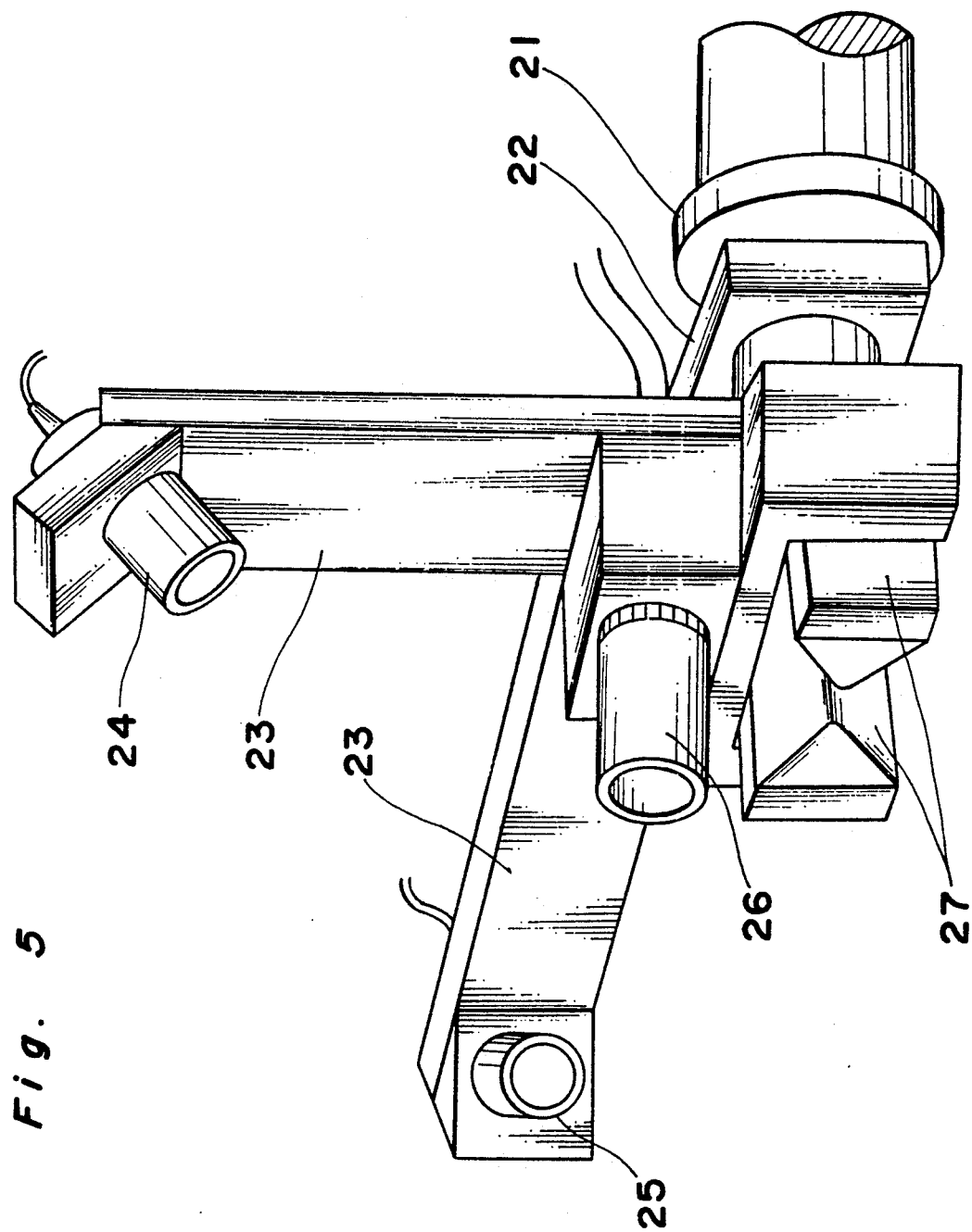

The detail of the laser measuring unit 12 is shown in FIG. 5, which includes a flange surface 21 of robot $J_6$ axis which is fastened to a bracket 22 supporting the laser measuring unit 12, a laser emitting light source 24 for the lateral slit light, a laser emitting light source 25 for the vertical slit light, and a camera 26 for receiving the lateral slit image and vertical slit image. The laser emitting light source 24 for the lateral slit light, and the laser emitting light source 25 for the vertical light, and the camera 26 are fixed to a camera supporting bracket 23. Furthermore, the laser emitting light source 24 for the lateral slit light and the laser emitting light source 25 for the vertical slit light are respectively arranged at right angles with respect to the camera 26, and the lateral slit image and the vertical slit image are arranged to be parallel respectively to X and Y axes of the vision coordinates system of the camera 26. Reference numeral 27 is a hand portion for capturing an electrical adjustment member, and which is opened and closed by pneumatic pressure and is mounted on to the bracket 22 supporting the laser measuring unit 12.

The sample 13 irradiated by the laser light has a square shape, and is attached to a side of the robot main body so as to be in parallel to the coordinate system of the robot.

Figure 8:
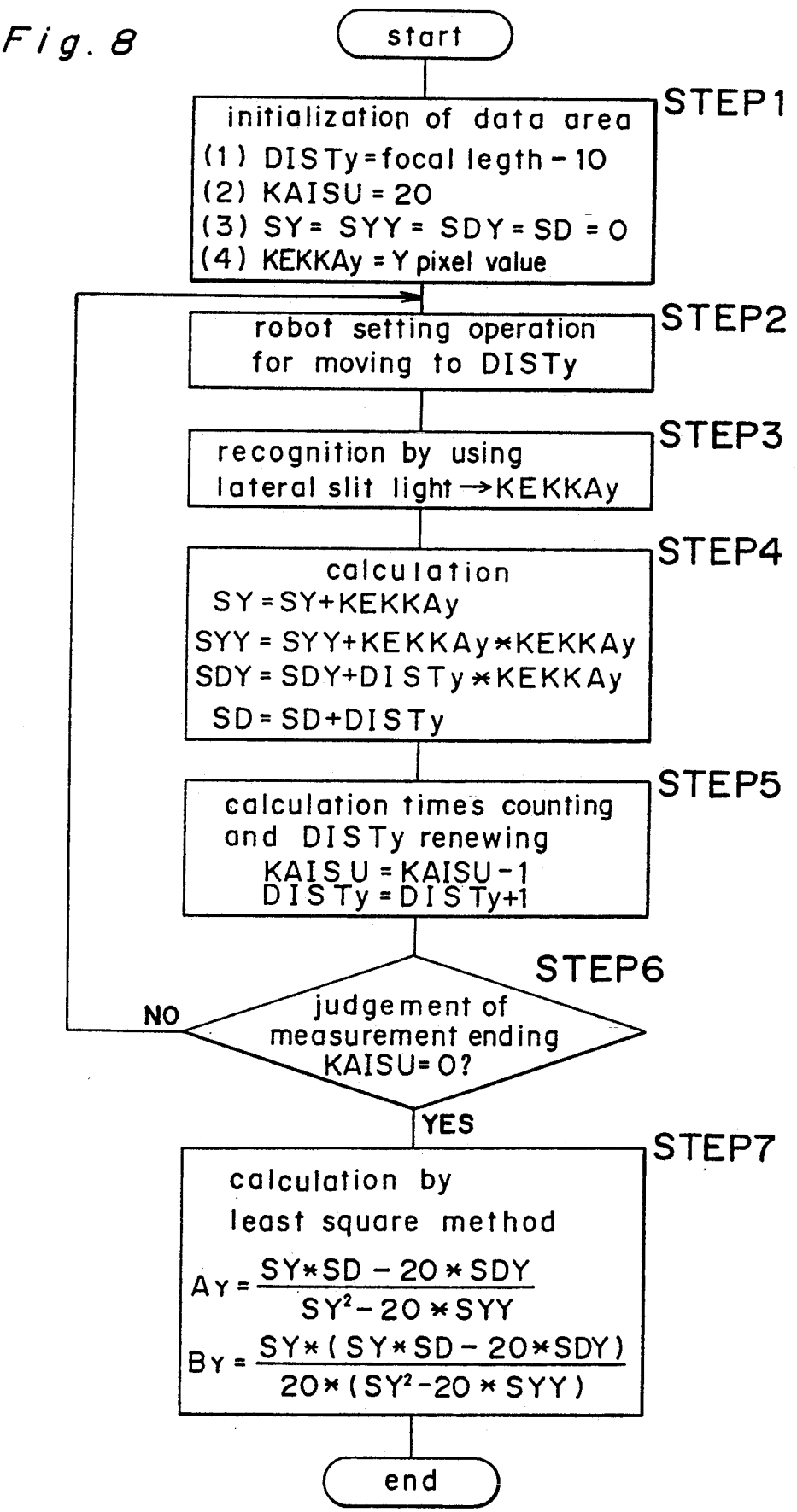

The three-dimensional position calculation method using the lateral slit light will be described with reference to the operation flowchart of FIG. 8.

At Step 1, the initialization for the various data area is conducted. $DIST_Y$ is the distance from the camera 26 of the laser measuring unit 12 to the sample 13, and the initial value is set at a distance of 10 mm less than the focal length with respect to the sample 13. SY is an area for storing the total sum of Y components of the end points of the lateral slit image (actually, the total sum of Y pixel values of the vision coordinate system), and the initial value is zero. SYY is an area for storing the total sum of square values of Y components of the lateral slit image end points (actually, the total sum of Y square pixel values of the vision coordinate system), and the initial value is zero. SDY is a value obtained by multiplying the distance from the camera 26 of the laser measuring unit 12 to the sample 13 by the Y component of the lateral slit image end point, and its initial value is zero. SD is a total sum of the distances from the camera 26 of the laser measuring unit 12 to the sample 13, and its initial value is zero. KAISU shows measuring times and its initial value is 20. $KEKKA_Y$ is a Y pixel value of the lateral slit image end point in the vision coordinate system when the sample is recognized by using the lateral slit light.

At Step 2, the operation setting for the robot 11 is effected. The robot 11 is moved so that the laser measuring unit 12 becomes perpendicular to the sample 13 and the position of the camera 26 of the laser measuring unit 12 is 10 mm closer to the sample 13 than the focal length, as shown in FIG. 3 (initial operation).

Figure 6:
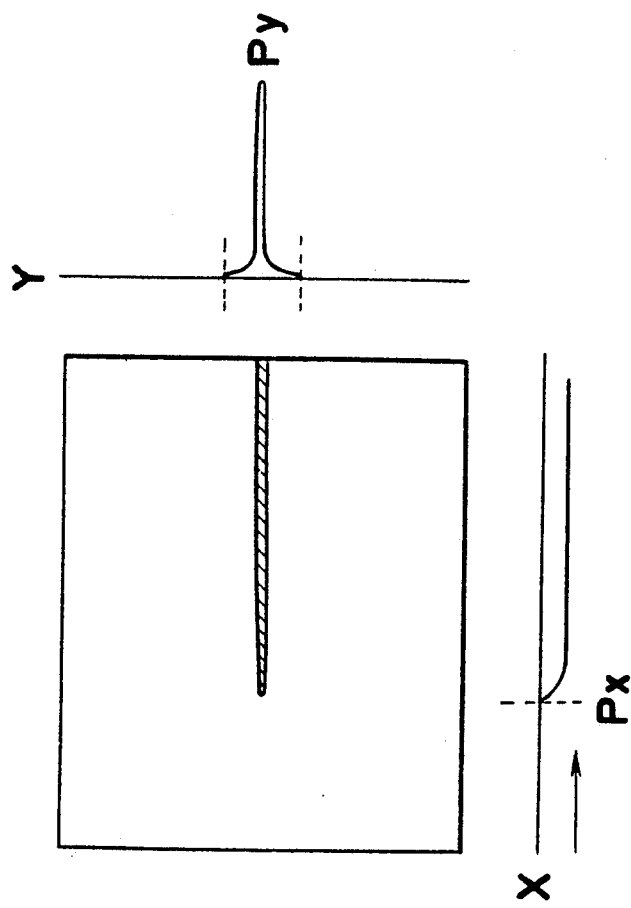

At Step 3, the recognition by using the lateral slit light is effected, and the result is returned to the variable $KEKKA_Y$. The recognition method will be described below. When the lateral slit image is binarized, the binary image becomes as shown in FIG. 6. When mapping is made on the X and Y axes of the vision coordinate system and the first brightness pass point is searched from the positive direction on the X axis, $P_X$ is obtained. Next, when the point where the mapping on Y axis has the largest brightness is searched on $X=P_X$, $P_Y$ is obtained.

$KEKKA_Y=P_Y$

At Step 4, in the calculation of SY, SYY, SDY, and SD, respective sums are calculated.

At Step 5, the calculation times are counted and $DIST_Y$ is renewed.

At Step 6, the measurement ending is sensed. When measurements have been made twenty times, the process is ended, and when made less than twenty times, the process returns by a loop, and the recognition and calculation is repeated by moving the robot each time so that the distance from the camera 26 of the laser measuring unit 12 to the sample 13 is increased further by 1 mm. In other words, by twenty measurements, the robot is moved to a position where the camera position of the laser measuring unit 12 is spaced away from the sample 13 by 10 mm more than the focal length.

At Step 7, the measurement is over, and by using SY, SYY, SDY, and SD obtained above, the relationship ($KEKKA_Y$) between the distance ($DIST_Y$) from the camera 26 of the laser measuring unit 12 to the sample 13 and Y component of the lateral slit image is calculated by the least square method.

$DIST_Y = A_Y \cdot KEKKA_Y + B_Y$

Figure 9:
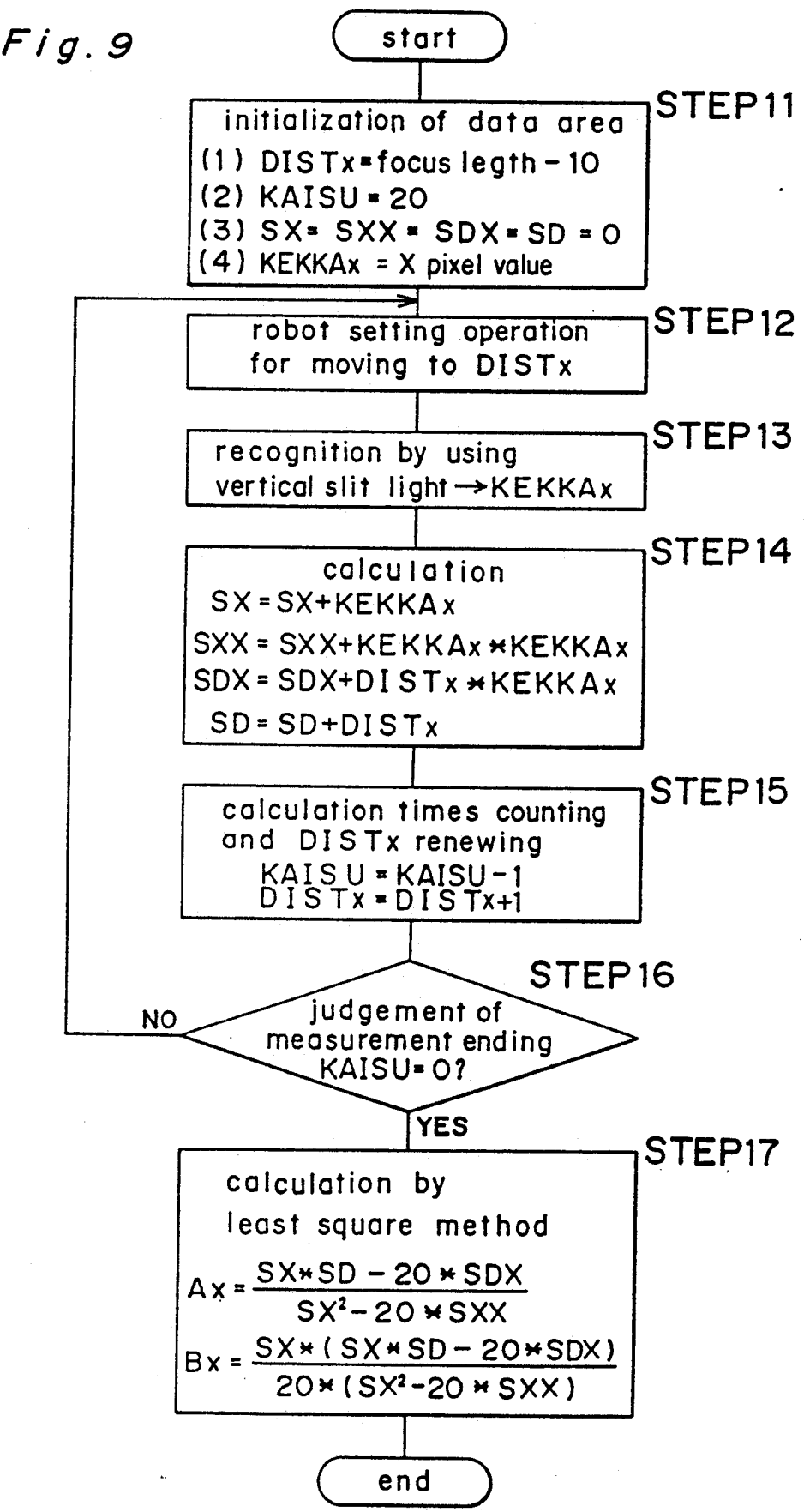

The operation flowchart in FIG. 9 shows a three-dimensional position calculation method using a vertical slit light. In step 11 the initialization for the various data area is conducted. $DIST_X$ is the distance from the camera 26 of the laser measuring unit 12 to the sample 13, SX is an area for storing the total sum of X components of the vertical slit image end points (actually, the total sum of X pixel values in the vision coordinate system), SXX is an area storing the total sum of squares of X components of the vertical slit image end points (actually, the total sum of square values of X pixel values of the vision coordinate system), SDX is a value obtained by multiplying the distance from the camera 26 of the laser measuring unit 12 to the sample 13 by the X component of the vertical slit image end point, and SD is the total sum of the distance from the camera 26 to the sample 13. $KEKKA_X$ is the x pixel value of the vertical slit image end point in the vision coordinate system when recognized by using the vertical slit light.

Figure 7:
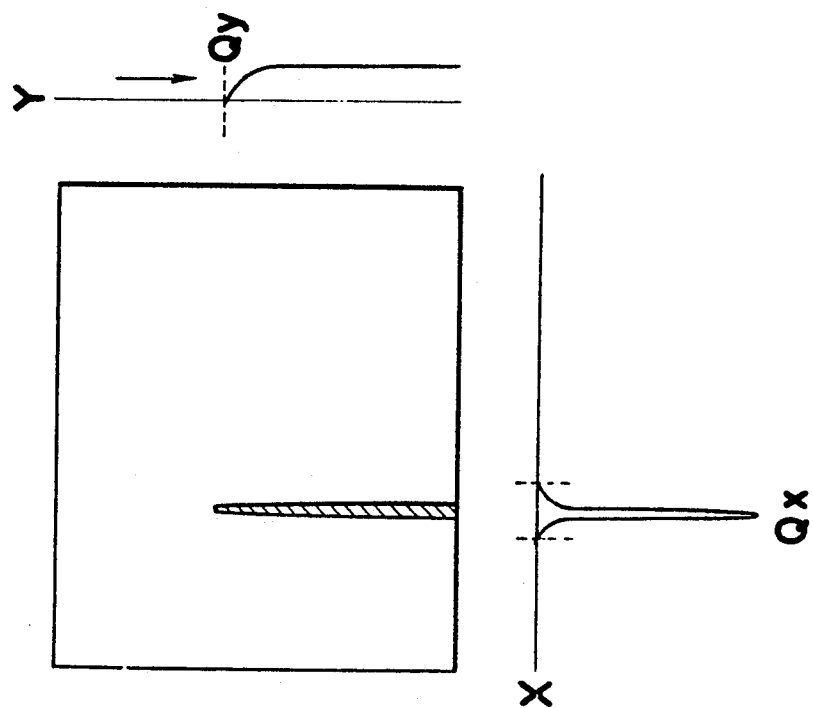

Here, the recognition method will be explained below. When the vertical slit image is binarized, the binary image becomes as shown in FIG. 7. When mapping is made on the X and Y axes of the vision coordinate system and the first brightness pass point is searched from the positive direction on the Y axis, $Q_Y$ is obtained. Next, when a point where an image on the X axis has a maximum intensity is searched on $(Y-Q_Y)$, $Q_X$ is obtained.

$KEKKA_X = Q_X$ $DIST_X = A_X \cdot KEKKA_X + B_X$

Steps 12–17 are the same as steps 2–7, but use the data for the vertical slit. By the above-described procedure, the depth (Z value) in the vision coordinate system can be obtained from $P_Y$ value of the lateral slit image end point and $Q_X$ value of the vertical slit image end point.

Next, the scaling factors of a pixel in the vision coordinate system with respect to the CGS unit system are represented by $G_X$ in the direction of the X axis of the vision coordinate system, and $G_Y$ in the direction of the Y axis thereof. When the lateral slit image end point is represented by $P_X$ pixel, $P_Y$ pixel, and the lateral slit image end point in CGS system is represented by X, Y, the following are obtained.

$$X = G_X * P_X$$

$$Y = G_Y * P_Y$$

$$Z = A_Y * P_Y + B_Y$$

Similarly, when the vertical slit image end point is represented by $Q_X$ pixel, $Q_Y$ pixel, and the vertical slit image end point in CGS system is represented by X, Y, the following are obtained.

$$X = G_X * Q_X$$

$$Y = G_Y * Q_Y$$

$$Z = A_X * Q_X + B_X$$

By the above procedure, from the lateral slit image end point and the vertical slit image end point, the value in the vision coordinate system can be obtained in CGS unit system.

The method for converting the value in the vision coordinate system into the absolute coordinate system will be described below. When the current position of the robot 11 is represented by $P_{HERE}$, and the offset of the camera 26 relative to the robot flange surface is represented by $P_{CAMERA}$, the coordinates of the origin of the vision coordinate system becomes $P_{HERE}:P_{CAMERA}$, where the symbol ":" represents the multiplication of 4 * 4 matrixes.

When the value of the lateral slit image end point in the vision coordinate system is represented by $V = (V_X, V_Y, V_Z)$, the value of the lateral slit image end point in the absolute coordinate system is obtained by $(P_{HERE}:P_{CAMERA}:V)$, where $P = P_X, P_Y, P_Z$).

Similarly, when the value of the vertical slit image end point in the vision coordinate system is represented by $W = (W_X, W_Y, W_Z)$, the value of the vertical slit image end point in the absolute coordinate system is obtained by $(P_{HERE}:P_{CAMERA}:W)$, where $P = (P_X, P_Y, P_Z)$.

The method for obtaining the three-dimensional position of the printed circuit board by using the three-dimensional position calculation method using the three-dimensional measuring system will be described with reference to FIG. 10.

Figure 10:
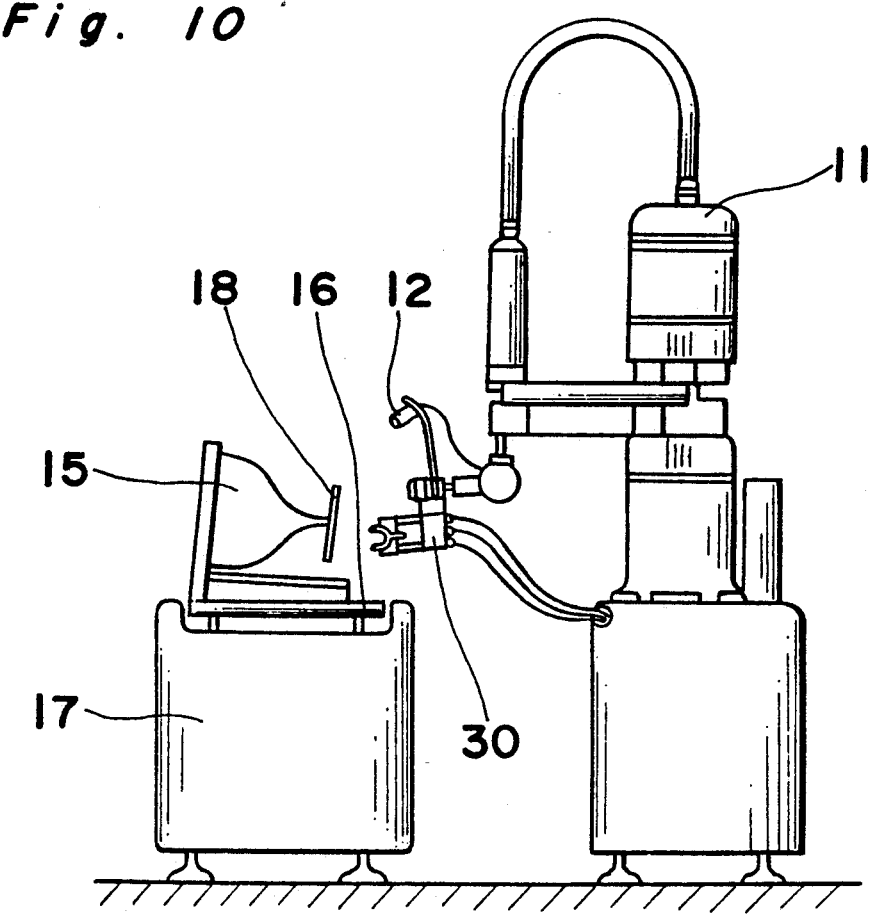
Figure 11:
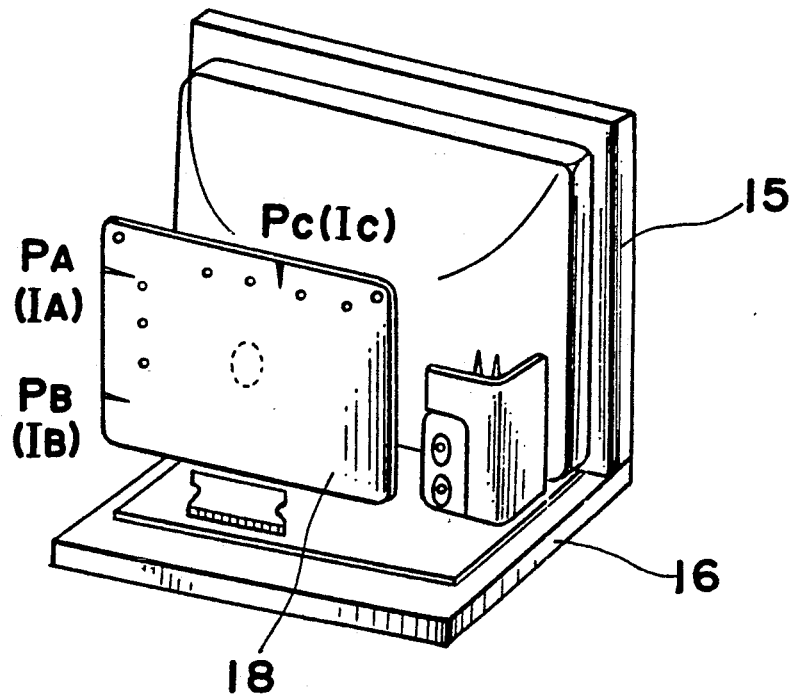
Figure 12:
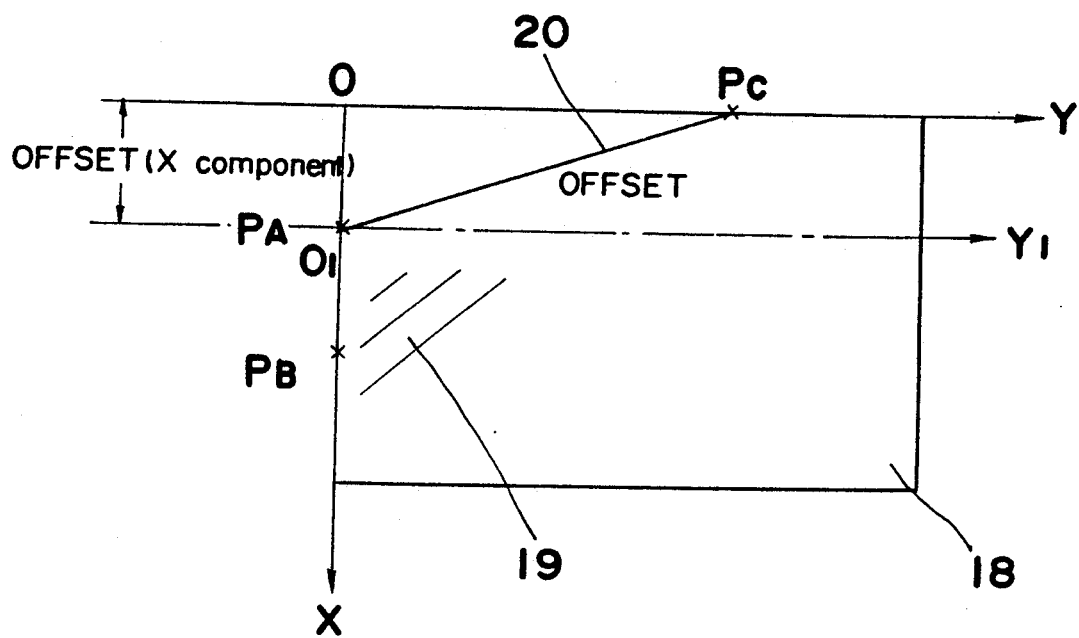

In FIG. 10, reference numeral 11 is a robot, reference numerals 12, 15, 16 and 17 are, respectively, a laser measuring unit, a workpiece, a pallet and a conveyer. When recognition instruction points for the workpiece 15 are properly supplied to the robot 11, lateral slit images $I_A$ and $I_B$, and a vertical slit image $I_C$ are obtained on a circuit board 18 from the laser measuring unit 12 as shown in FIG. 11. By the above described method, the end points of the lateral slit image $I_A$ and $I_B$ become $P_A$ and $P_B$, respectively, and the end point of the vertical slit image $I_C$ becomes $P_C$. By using FIG. 12, the three-dimensional position of the printed circuit board can be obtained. In FIG. 12, reference numeral 19 is obtained by the coordinate system made by $P_A$, $P_B$, and $P_C$ and $O_1\_XY_1Z = $ FRAME $(P_A, P_B, P_C)$, where FRAME is a function of the coordinate system and returns the coordinate system wherein $P_A$ is the origin, $P_B$ is a point on axis, and $P_C$ is a point in the positive direction of the XY plane.

OFFSET INV$(O_1\_XY_1Z):P_C$, where "INV" is an inverse matrix, and $P_C$ is at "OFFSET" 20 seen from $O_1\_XY_1Z$.

$$O\_XYZ = O_{113} XY_1Z + X(\text{OFFSET} * X)$$

Therefore, the three-dimensional position $O\_XYZ$ of the printed circuit board is in the coordinate system obtained by translating the coordinate system $O_1\_XY_1Z$ by the X component of OFFSET. "X" is an operator for extracting the X component, and "+X(OFFSET * X)" represents a calculation of translation of the X axis.

(2) By using the combination of a three-dimensional position of the printed circuit board and the position of an electrical adjustment member mounted on the hand portion of the robot at this time relative to the printed circuit board as reference positions, a method for determining the electrical adjustment position of a new printed circuit board can be carried out. This method will be described with reference to FIG. 13.

Figure 13:
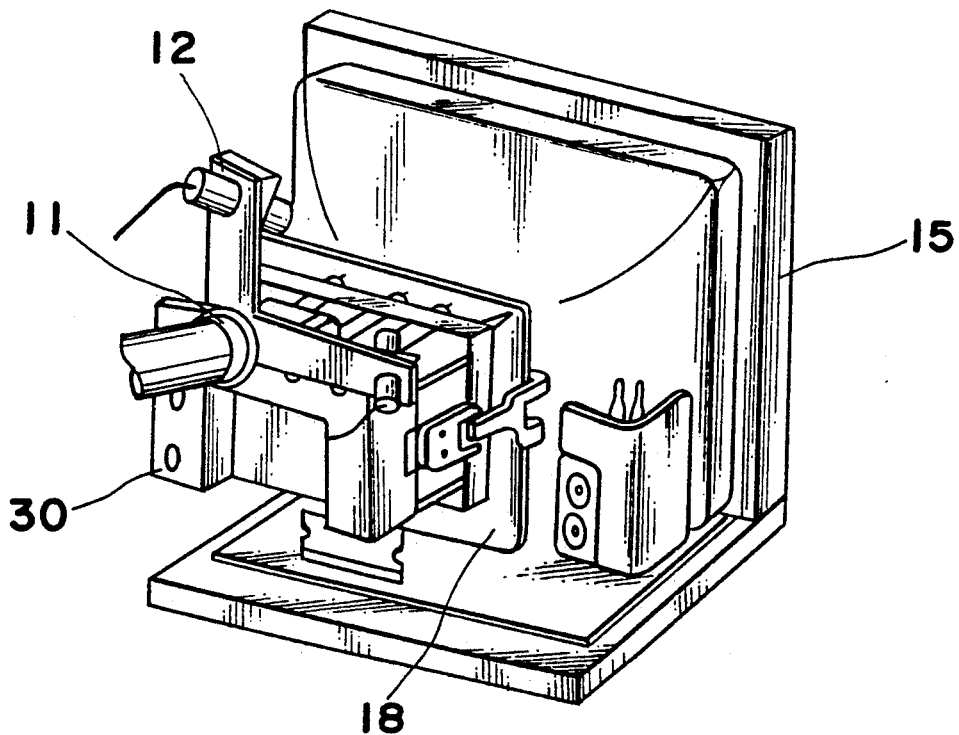

FIG. 13 is a perspective view showing the electrical adjustment position of the electrical adjustment member with respect to a printed circuit board 18, in which there are shown the robot 11 (partly), the laser measuring unit 12, the electrical adjustment member 30, and the workpiece 15.

"O\_XYZ" is made to be the three-dimensional position of the printed circuit board as a reference position, and "VOLUME" is made to be the electrical adjustment position of the electrical adjustment member 30 relative to the printed circuit board 18 as a further reference position.

The relative position O\_VOLUME of the electrical adjustment position "VOLUME" relative to the printed circuit board 18 becomes $$O\_VOLUME = INV(O\_XYZ):VOLUME.$$

If a three-dimensional position of a new printed circuit board is represented by $O_1\_X_1Y_1Z_1$, the electrical adjustment position $VOLUME_1$ relative to the new printed circuit board becomes $$VOLUME_1 = O_1\_X_1Y_1Z_1:VOLUME.$$

(3) Actually, the recognition includes some pixel errors, and the robot also includes some errors in respect of the absolute accuracy. Therefore, a method for normally capturing the printed circuit board even if some errors are caused will be described below.

Figure 14:
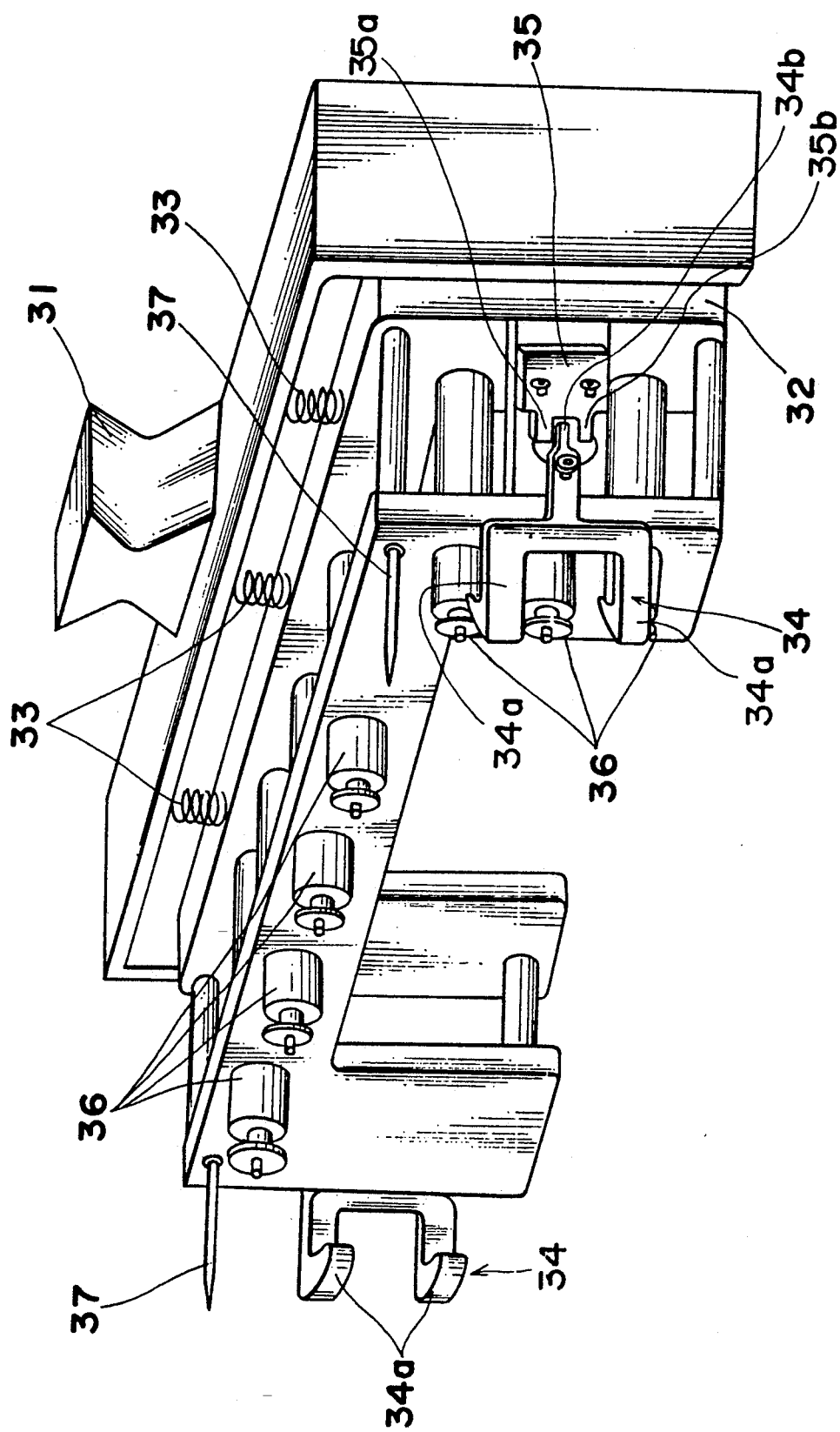

FIG. 14 is an overall perspective view of the electrical adjustment member 30, which includes a bracket 31 to be captured by the hand portion of the robot, and the electrical adjustment member main body 32 is attached to the bracket 31 by springs 33. The electrical adjustment member main body 32 is provided with two claws 34 with tapered portions 34a for capturing the edge portions of the printed circuit board 18. The tapered portions 34a are arranged so that when the tapered portions 34a move over the edge portions of the printed circuit board 18, the closed and open states thereof can be recognized by a sensor 35 and they are normally in the closed state by being returned by springs 33. The sensor 35 has a pair of photosensor elements 35a and 35b to recognize the backward projection 34b of the claw 34 when the projection 34b thereof is inserted between the photosensor elements 35a and 35b in the closed state of the claw 34 and when the projection 34b thereof moves out from between the photosensor elements 35a and 35b in the open state of the claw 34. Elements 36 are provided to support the circuit board in the member 30.

Figure 15:
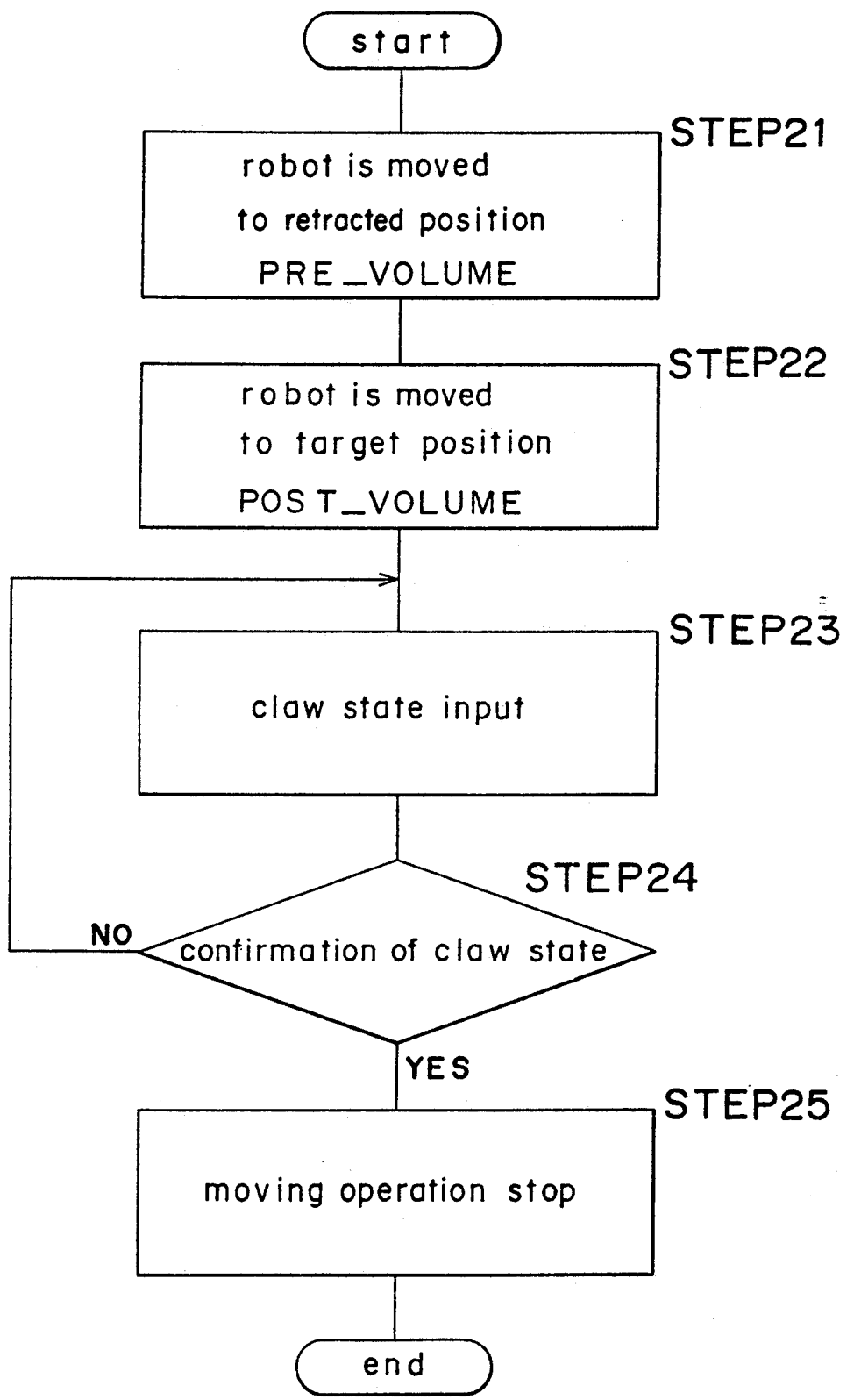

A description will be given of the operation with reference to the operation flowchart of FIG. 15.

Step 21 is an initial operation when the robot is moved to the electric adjustment position for the printed circuit board, and the robot is moved to the retracted position (PRE_VOLUME) retracted by 3 mm from the electric adjustment position in the perpendicular direction relative to the face of the printed circuit board.

PRE_VOLUME=O_VOLUME+Z(3)

"+Z(3)" represents the calculation of z axis translation.

At Step 22, the robot is moved to the electric adjustment position of the printed circuit board, and moved to the position (POST_VOLUME) 3 mm past the electric adjustment position in the perpendicular direction relative to the printed circuit board. Further, the move command in Step 22 is a command which allows other commands to be executed in advance, and during the moving operation, command in the following Steps 23, 24 and 25 are executed.

At Step 23, the input signal showing the state of the claws 34 is read out, and at Step 24, it is confirmed whether or not each of the claws has shifted from the closed state to the open state and then to the closed state. The operation in this case will be described as follows. The positioning pins 37 (refer to FIG. 14.) are inserted into the positioning holes for positioning the printed circuit board. Next, after contacting the end edges of the printed circuit board, when the tapered portions 34a are moved over the end edges of the printed circuit board 18, the claws become open and at the final state of capturing, the claws become closed because the tapered portions 34a do not contact the printed board. When all the capturing claws 34 have shifted from the closed states, to the open states and again to the closed states, the printed circuit board 18 has been captured, i.e. the "Yes" condition, and at Step 25, the moving operation is stopped. If less than all of the claws are sensed as being in the closed condition, the "No" condition, the program returns to the claw state input step.

(4) At the captured position, the servo electric power source is cut off only for the third axis of the robot, and in the state free from the servo control, the stress of the electric adjustment member and the hand portion of the robot at the time of capturing the printed circuit board, is released, the current position of the robot at the servo-free time is set as the final captured position for the printed circuit board, and the third axis is again servo-locked.

Figure 16:
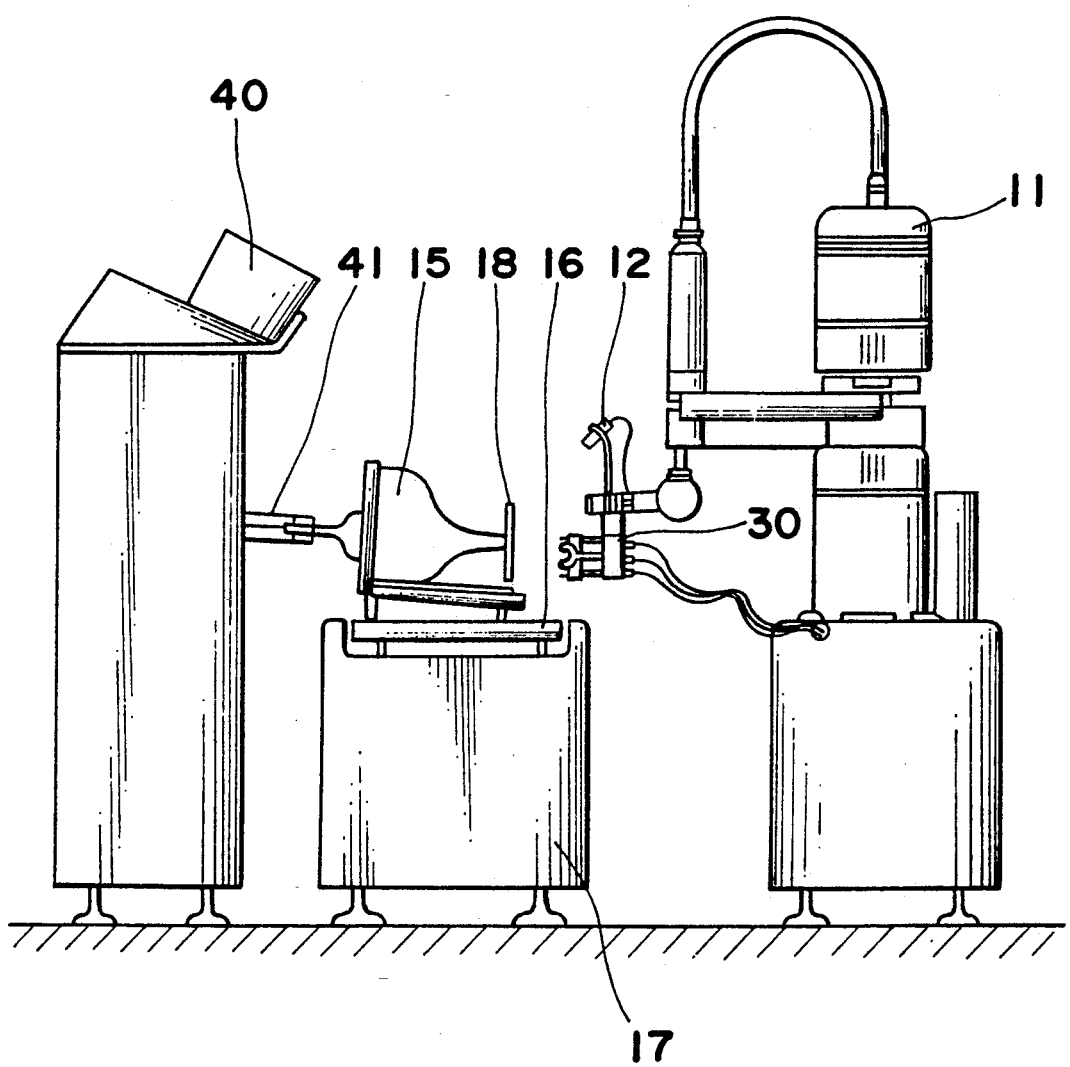

A concrete example according to the present invention will be described below with reference to FIGS. 16 and 17. FIG. 16 is a drawing showing the whole device, which includes a robot 11, a laser measuring unit 12, an electric adjustment member 30, a workpiece 15, a pallet 16, a conveyer 17, a brightness meter 40 and an actuator 41 for the sensor.

Figure 17:
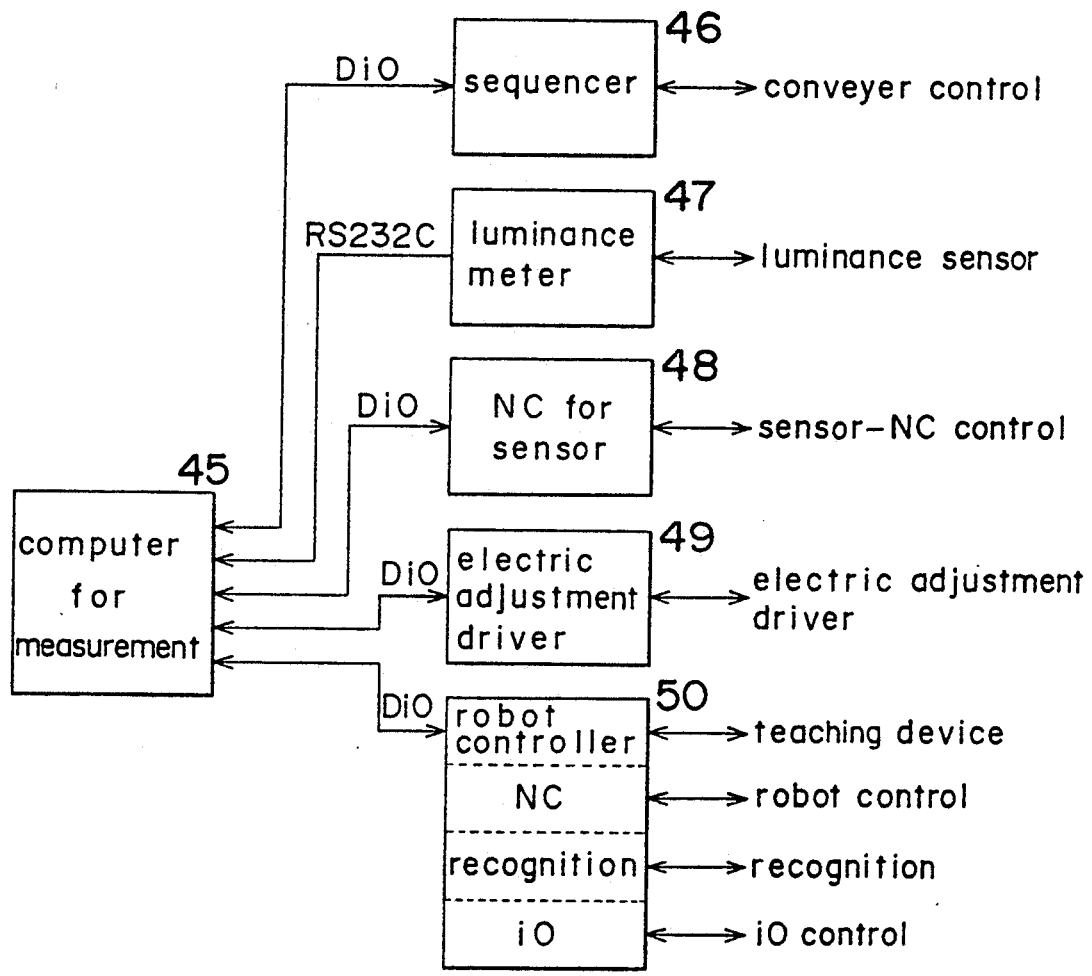

FIG. 17 is a control system diagram, which includes a computer 45 for measurement, a sequencer 46 for the conveyer control, luminance sensor 47, numerical control 48 a driver 49 for the electric adjustment, and a robot controller 50.

Next, the outline of the operation will be described below.

Upon arrival of the workpiece 15 at a position opposite the robot 11, the computer 45 for measurement applies an operation start signal to the robot controller 50. The robot 11 moves to three recognition teaching points in advance counted so as to emit two lateral slit light beams and one vertical slit light beam at respective teaching points, thereby to recognize the three-dimensional position of the printed circuit board as described above in connection with FIG. 12, whereby the electric adjustment position for the new printed circuit board is obtained.

Next, the robot is moved to the retracted position 3 mm ahead of the electric adjustment position for the printed circuit board in the direction perpendicular thereto. Then, the robot starts to move toward the, electric adjustment position for the printed circuit board and to a position 3 mm therebeyond in the direction perpendicular to the board. During moving, when all of the end face capturing claws of the electric adjustment member 30 have shifted from the closed states, through the open states again to the closed states, the printed circuit board has been captured, and the robot 11 moving.

The robot controller 50 supplies to the controller for measurement 45 the signal indicating the completion of the capture by the robot. The measurement computer 45 turns the driver of the electric adjustment member to effect the white balance adjustment.

Upon completion of the adjustment, the measurement computer 45 applies a retracting signal to the robot controller 50, whereby the robot controller 50 detaches the claws 34, retracts the robot 11 to the retracted position and applies a retraction completion signal to the measurement computer 45.

Upon receiving the retraction completion signal, the measurement computer 45 instructs the apparatus to move the workpiece 15 to the next position.

As is clear from the foregoing description, according to the present invention, it is possible to achieve the automatic adjustment of the printed circuit board of the display device which has been so far mostly adjusted manually. Furthermore, the present invention is not only applicable to the automatic adjustment in the display device, but also to other uses for noncontact measurement of the three-dimensional position and automatic adjustment.

Although the present invention has been fully descried by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A method for measuring a three-dimensional position of an object to be captured comprising providing a laser measuring unit having an image recognition camera confronting the object and a first and a second laser emitting light source, emitting from the first laser emitting light source laser light for irradiating a lateral slit light onto the object from a slant direction relative to a vertical axis of a vision coordinate system, and emitting from the second laser emitting light source further laser light for irradiating a vertical slit light from a slant direction relative to a lateral axis of the vision coordinate system, one slit image on the vertical axis of the object and one slit image on the lateral axis thereof and one of the slit images on the vertical and lateral axes thereof formed before and after the laser measuring unit is moved a predetermined amount in a direction of a camera optical axis relative to the object are taken into the camera, and calculating the three-dimensional position of the object from the relationship between a predetermined moving amount of the laser measuring unit and deviation of the slit images on vision coordinates of the coordinate system.

2. A method for measuring a three-dimensional position of an electronic component to be captured by an electric adjustment member at an electric adjustment position of the electronic component, comprising the steps of:

provinding in a control of a servo-driven industrial robot an initial position of an electric adjustment member mounted on a hand portion of the industrial robot;

calculating, as an electric adjustment position for the electronic component, the three-dimensional position of the electronic component to be captured by said electric adjustment member and mounted on a workpiece, said calculating step being constituted by providing a laser measuring unit having an image recognition camera confronting the electronic component and a first and second laser emitting light source, emitting from the first laser emitting light source laser light for irradiating a lateral slit light onto the electronic component from a slant direction relative to a vertical axis of a vision coordinate system, and emitting from the second laser emitting light source further laser light for irradiating a vertical slit light onto the electronic component from a slant direction relative to a lateral axis of the vision coordinate system, one slit image on the vertical axis of the electronic component and one slit image on the lateral axis thereof and one of the slit images on the vertical and lateral axes thereof formed before and after the laser measuring unit is moved a predetermined amount in a direction of a camera optical axis relative to the object are taken into the camera, and calculating the three-dimensional position of the electronic component from the relationship between a pre-taught moving distance of the laser measuring unit and deviation of the slit images on vision coordinates of the coordinate system;

compensating the initial position of the electric adjustment member on the hand portion of the industrial robot by the amount of deviation of the electric adjustment position of the electronic component from the initial position so as to move the electric adjustment member to the electric adjustment position of the electronic component.

3. The method as claimed in claim 2 further comprising the steps of:

providing at least two claws with tapered portions and movable between closed and open states for capturing an electronic component by holding an end face of the electronic component onto the electric adjustment member mounted on the hand portion of the industrial robot;

moving the electric adjustment member according to the deviation of the electric adjustment position of the electronic component to the electric adjustment position of the electronic component with the claws normally closed;

causing the claws to be opened as they are moved over end edges of the electronic component after contact of the tapered portions therewith and then to be closed at a final capturing position after the tapered portions have passed the end edges;

detecting the closed state and open state of the capturing claws as the tapered portions thereof are moved over end edges of the electronic component;

stopping movement of the industrial robot when all of the capturing claws have been detected as having been shifted from the closed state through the open state to the closed state again; and determining the position of the industrial robot when all of the capturing claws have reached the closed state again as the captured position of the electronic component.

4. The method as claimed in claim 3 further comprising the steps of:

cutting off a servo power source for only the axis of the industrial robot perpendicular to the end face of the electronic component when the industrial robot is determined to be at the captured position so as to release stress on the electronic adjustment member and the hand portion of the industrial robot at the captured position so that the industrial robot is in a state free from servo control as to said axis; and determining the position of the industrial robot in the servo-free state as the final captured position of the electronic component, and servo-locking the servo power source for said axis of the industrial robot.

* * * * *